United States Patent
Crudgington

(10) Patent No.: US 7,950,671 B2
(45) Date of Patent: May 31, 2011

(54) BRUSH SEAL ASSEMBLY

(75) Inventor: Peter Francis Crudgington, Freshford (GB)

(73) Assignee: Cross Manufacturing Company (1938) Limited, Bath, Avon (GB)

( * ) Notice: Subject to any disclaimer, the term of this patent is extended or adjusted under 35 U.S.C. 154(b) by 0 days.

(21) Appl. No.: 12/091,199

(22) PCT Filed: Oct. 1, 2007

(86) PCT No.: PCT/GB2007/003694
§ 371 (c)(1),
(2), (4) Date: Apr. 23, 2008

(87) PCT Pub. No.: WO03/091609
PCT Pub. Date: Nov. 6, 2003

(65) Prior Publication Data
US 2009/0224483 A1    Sep. 10, 2009

Related U.S. Application Data

(60) Provisional application No. 60/849,324, filed on Oct. 4, 2006.

(30) Foreign Application Priority Data

Oct. 3, 2006  (GB) ................... 0619488.0

(51) Int. Cl.
*F16J 15/44* (2006.01)
(52) U.S. Cl. ...................................................... 277/355
(58) Field of Classification Search ............... 277/355
See application file for complete search history.

(56) References Cited

U.S. PATENT DOCUMENTS

| 2,334,349 | A | * | 11/1943 | Mika | 277/577 |
| 5,066,024 | A | * | 11/1991 | Reisinger et al. | 277/355 |
| 5,090,710 | A | * | 2/1992 | Flower | 277/355 |
| 6,302,400 | B1 | * | 10/2001 | Werner et al. | 277/355 |
| 2002/0020968 | A1 | * | 2/2002 | Gail et al. | 277/355 |
| 2002/0130469 | A1 | * | 9/2002 | Kono | 277/355 |
| 2002/0189096 | A1 | | 12/2002 | Flower | |
| 2003/0178778 | A1 | * | 9/2003 | Szymbor et al. | 277/355 |
| 2003/0201608 | A1 | * | 10/2003 | Addis | 277/355 |
| 2005/0040602 | A1 | * | 2/2005 | Beichl et al. | 277/355 |

FOREIGN PATENT DOCUMENTS

| EP | 0 293 140 | 11/1988 |
| EP | 0 911 554 | 4/1999 |
| EP | 1 146 266 | 10/2001 |
| EP | 1 347 218 | 9/2003 |
| EP | 1672256 | 6/2006 |
| FR | 2 626 646 | 8/1989 |
| WO | WO 99/06673 | 2/1999 |
| WO | WO 01/13013 | 2/2001 |
| WO | WO 03/091609 | 11/2003 |

* cited by examiner

*Primary Examiner* — Vishal Patel
(74) *Attorney, Agent, or Firm* — King & Schickli, PLLC

(57) ABSTRACT

A brush seal assembly including a pair of annular plates (11,12) defining an annular slot (14) between them and a radially outer chamber (15) opening into the slot (14); and an annular brush seal (13) having bristles (16) and an enlarged portion (17) at its outer periphery formed by welding the bristles (16) together, the brush seal (13) extending through the slot (14) with its enlarged portion (17) retained in the chamber (15) wherein at least a portion of one of the plates (11, 12) has an extension thereof which is deformed over the other plate (11, 12) to hold the plates (11, 12) together to form the assembly characterised in that one of the plates (12) has a flat face in the region of the slot (14).

18 Claims, 3 Drawing Sheets

BRUSH SEAL ASSEMBLY

This application claims the benefit of U.S. Provisional Patent Application Ser. No. 60/849,324, filed Oct. 4, 2006 and United Kingdom Application No. 0619488.0, filed Oct. 3, 2006, the disclosures of each of which are incorporated herein in their entirety by reference.

FIELD OF THE INVENTION

This invention relates to brush seal assemblies.

BACKGROUND OF THE INVENTION

Brush seals are typically used in, for example, gas turbine engines to seal between a stator and a rotating shaft. The bristles of the brush seal frequently extend between a pair of plates so that their free ends project there from and commonly the bristles and plates are welded into a single assembly. This arrangement enables easy handling and assembly and enables the unit to be provided with a very precise outer diameter. However, in use the bristles become worn and from time to time the seals need replacing. As the plates are made from rather expensive alloys, this can lead to a fairly high cost of ownership for the gas turbine.

In EP-A-0911554A the possibility of clamping the brush seal elements between two plates is shown, but the plates are then held together by their mounting means and this creates problems of assembly and replacement.

SUMMARY OF THE INVENTION

According to the present invention there is provided a brush seal assembly including a pair of annular plates defining an annular slot between them and a radially outer chamber opening into the slot; and an annular brush seal having an enlarged portion at its outer periphery, the brush seal extending through the slot with its enlarged portion retained in the chamber wherein at least a portion of one of the plates is deformed over the other plate to hold the plates together to form the assembly characterised in that one of the plates has a flat face in the region of the slot and/or in that the other plate has a portion for squeezing locally the bristles against the flat region to hold the bristles or in that wherein the enlarged portion is asymmetric relative to the bristles.

In one embodiment the one plate is formed by a first leg of an L section member and the extension is formed by the other.

In any embodiment the portion of the one plate may be formed by local deformation and preferably at least two portions are deformed.

Thus typically a number of tabs will be deformed out of an originally annular portion of the extension to locate and hold the two plates together. When the brush seal needs replacing, the tabs can be machined away and a new brush seal inserted. Further tabs can then be formed from previously un-deformed portions of the extension. In this way the other plate can be reused over a significant number of repair cycles and the one plate can also be reused until there is insufficient under formed material left to form the deformed portions or tabs.

Thus from another aspect the invention consists in a method of refurbishing a seal as defined above including:

(a) releasing the plates by removing or releasing the portional portions;
(b) inserting a new brush seal; and
(c) deforming at least one different portion of the one plate over the other plate to hold the plates together.

As has already been indicated, it is believed that in most instances the step of removal will need to take place by machining.

It will also be understood that one plate could be deformed around the entire circumference of the extension, if that degree of location was required. In that case the one plate would become sacrificial, but the other plate would still be reusable.

Although the invention has been defined above it is to be understood it includes any inventive combination of the features set out above or in the following description.

BRIEF DESCRIPTION OF THE DRAWING FIGURES

The invention may be performed in a number of ways and a specific embodiment will now be described, by way of example, with reference to the accompanying drawings, in which.

DETAILED DESCRIPTION OF THE INVENTION

Figure 1:
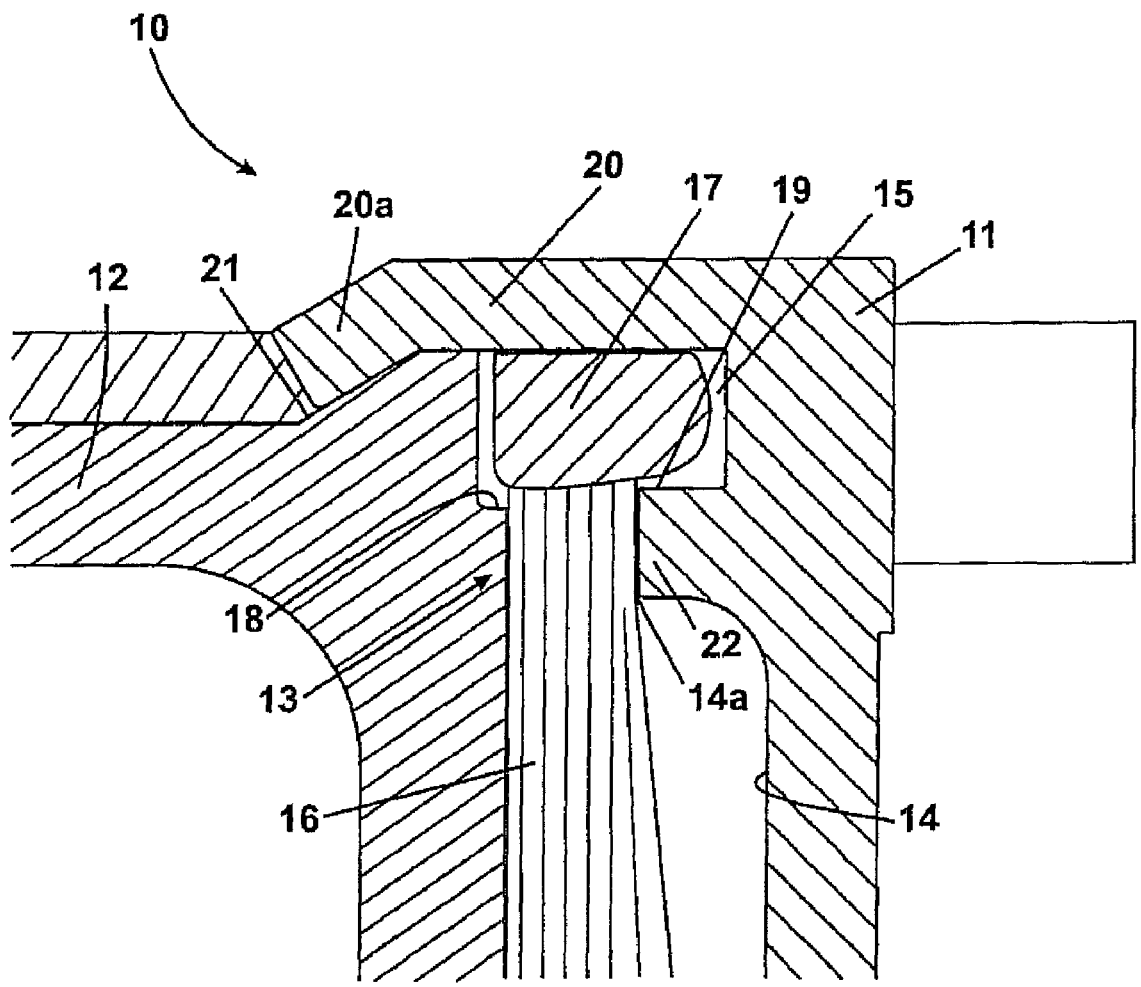
FIG. 1 is a scrap radial cross-section through a portion of an annular brush seal assembly.

Thus a brush seal assembly, generally indicated at 10, includes a front plate 11, a rear plate 12 and a brush seal 13.

The plates define a radially extending slot 14, which is open at its radially inner end (not shown) and an outer peripheral annular chamber 15, which opens into the slot 14. This will reduce machining cost and is particularly made suitable with the clamping feature mentioned below. The bristles 16 of the brush seal 13 are joined together by an enlarged asymmetric root portion 17, formed by welding the ends of the bristles together. The root portion 17 is generally rectangular in section and dimensioned so as not to pass through opening 14a, which forms the peripherally outer portion of the slot 14. It will be noted that seats 18 and 19 are formed in the chamber 15 on either side of the opening 14a so as to prevent the root portion 17 from becoming rotated to the extent that it can be pulled out through the opening 14a.

Each of the plates 11 and 12 are generally L shaped in radial section so that the plate 11 has an annular extension or leg 20 that can be locally deformed inwardly to form tabs 20a that engage on an inclined shoulder 21 formed on the plate 12. This fixing causes a projection 22 on plate 11 to clamp the bristles 16 against the plate 12 by squeezing them against the plate 12. The tabs 20a may conveniently be spaced at approximately 120° intervals.

In due course, when the bristles 16 have become worn, the assembly 10 can be removed from the gas turbine and the tabs 20a machined off to release the assembly. A new brush seal 13 can be inserted and the plates re-engaged by forming new tabs 20a in under formed portions of the leg 20. Eventually a new front plate 11 will need to be provided, but the rear plate can still be recycled. As the alloys from which the plates 11 and 12 are formed are expensive and the seals may typically be a meter or more in diameter, this recycling will significantly reduce the cost of ownership of the brush seal assembly.

Figure 2:
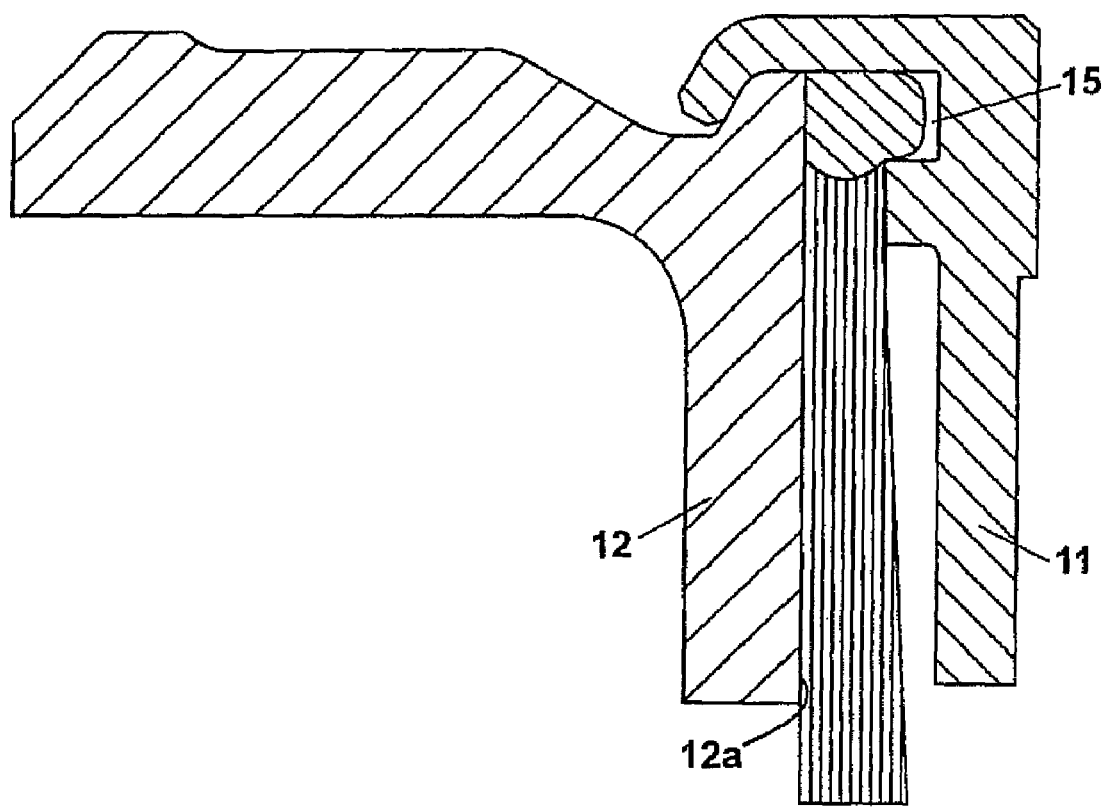
FIG. 2 is a corresponding view of another embodiment.
Figure 3:
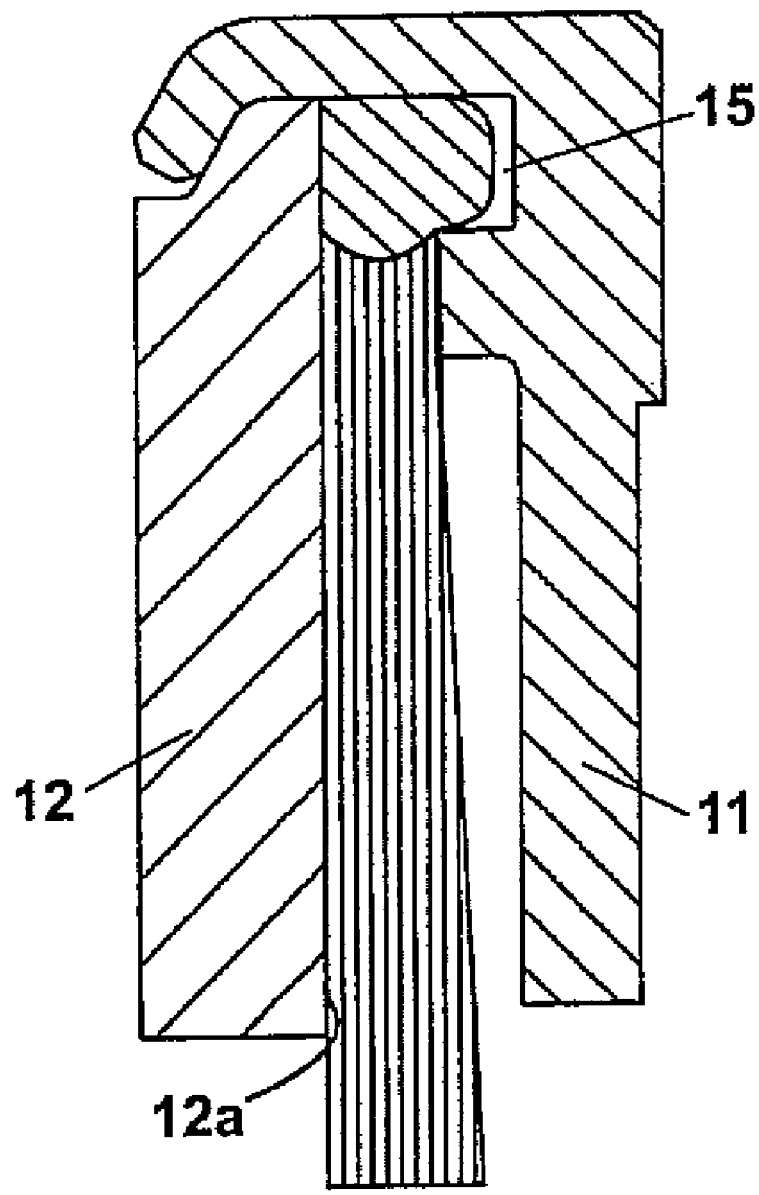
FIG. 3 is a corresponding view of a third embodiment.

FIGS. 2 and 3 illustrate alternative embodiments where a face 12a of the rear plate 12 is flat both in the bristle clamping region and in the region of the slot 14. In these cases the chamber 15 defined by the slot 14 lies entirely within the front plate 11 with the rear plate 12 simply defining one wall. This approach is surprising as it might be thought difficult to retain the brush seal 13. However, the clamping of the bristles makes it particularly efficacious.

It will be appreciated that instead of just having local tabs 20a, the plates 11,12 could be joined together around the entire circumference by spinning over the extension 20.

The invention claimed is:

1. A brush seal assembly including:
   first and second annular plates defining an annular slot between them and a radially outer chamber opening into the slot, said first plate being generally L-shaped, said assembly having a chamber defined by a recess on the generally L-shaped first plate and an opposing single planar annular face on the second plate, said second plate further comprising an indentation on a surface external to the slot and chamber; and
   an annular brush seal having welded bristles forming an enlarged portion at one end, the brush seal extending through the slot with the enlarged portion retained in the chamber and the bristles extending along the single planar annular face, wherein an end portion of the first plate has an extension thereof which is deformed over the second plate and at least partially received in the indentation to hold the plates together to form the assembly.

2. A brush seal assembly as claimed in claim 1 wherein the first plate has a portion locally squeezing the bristles against the flat region on the second plate to hold the bristles.

3. A brush seal assembly as claimed in claim 1 wherein the enlarged portion is asymmetric relative to the bristles.

4. A brush seal assembly as claimed in claim 2 wherein the enlarged portion is asymmetric relative to the bristles.

5. An assembly as claimed in claim 1 wherein the first plate is formed by a first leg of an L sectioned member and the extension is formed by a second leg of the L sectioned member.

6. An assembly as claimed in claim 2 wherein the first plate is formed by a first leg of an L sectioned member and the extension is formed by a second leg of the L second member.

7. An assembly as claimed in claim 3 wherein the first plate is formed by a first leg of an L sectioned member and the extension is formed by a second leg of the L sectioned member.

8. An assembly as claimed in claim 4 wherein the first plate is formed by a first leg of an L sectioned member and the extension is formed by a second leg of the L sectioned member.

9. An assembly as claimed in claim 1 wherein the portion of the end first plate is fanned by local deformation.

10. An assembly as claimed in claim 2 wherein the portion of the end first plate is fanned by local deformation.

11. An assembly as claimed in claim 3 wherein the portion of the end first plate is fanned by local deformation.

12. An assembly as claimed in claim 4 wherein the portion of the end first plate is fanned by local deformation.

13. An assembly as claimed in claim 5 wherein the portion of the end first plate is fanned by local deformation.

14. A brush seal assembly comprising:
    a first annular plate having an L-shaped section including a recess;
    a second annular plate comprising a single planar annular face extending to a radially outer portion of the second plate, the first plate engaging the second plate to hold the plates together such that the recess of the first plate faces the single planar annular face of the second plate and forms a radially outer chamber opening into an annular slot between the plates;
    an annular brush seal having bristles and a root portion, said root portion positioned in the recess at one side and engaged by the single planar annular face on an opposing side,
    the first plate includes an extension, the extension engaging the second plate,
    the second plate further comprising an inclined shoulder from an outer surface engaging the extension.

15. The brush seal of claim 14, wherein the root portion is asymmetric.

16. A brush seal assembly comprising:
    a pair of annular plates defining an annular slot and a radially outer chamber between them, one of said plates including an extension engaging one of an indentation or an inclined shoulder from an outer surface of the other of said plates to form the assembly; and an annular brush seal including bristles that extend through the annular slot, and further including a root portion contained within the radially outer chamber, one of the plate having a recess that faces a single planar annular face of the other of the plates to form the radially outer chamber.

17. A method of refurbishing a seal as claimed in claim 1 including:
    (a) releasing the plates by removing or releasing the extension;
    (b) inserting a new brush seal according to claim 1;
    (c) deforming at least one different extension of the first plate over the second plate to hold the plates together.

18. A method as claimed in claim 17 wherein the step of removing is performed by machining.

* * * * *